US011657496B2

(12) United States Patent
Knerr

(10) Patent No.: US 11,657,496 B2
(45) Date of Patent: May 23, 2023

(54) INSPECTION SUPPORT APPARATUS

(71) Applicant: Rolls-Royce North American Technologies Inc., Indianapolis, IN (US)

(72) Inventor: Ronald Knerr, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 775 days.

(21) Appl. No.: 16/433,418

(22) Filed: Jun. 6, 2019

(65) Prior Publication Data

US 2020/0388018 A1    Dec. 10, 2020

(51) Int. Cl.
| | | |
|---|---|---|
| *F01D 5/00* | (2006.01) | |
| *G06T 7/00* | (2017.01) | |
| *G01B 21/04* | (2006.01) | |
| *G06T 7/73* | (2017.01) | |
| *F01D 21/00* | (2006.01) | |

(52) U.S. Cl.
CPC .............. *G06T 7/001* (2013.01); *F01D 5/005* (2013.01); *F01D 21/003* (2013.01); *G01B 21/047* (2013.01); *G06T 7/75* (2017.01); *F05D 2230/80* (2013.01)

(58) Field of Classification Search
CPC . G06T 7/001; G06T 7/75; F01D 5/005; F01D 21/003; G01B 21/047; G01B 5/0004; F05D 2230/80; F05D 2260/80
See application file for complete search history.

(56) References Cited

U.S. PATENT DOCUMENTS

| | | | |
|---|---|---|---|
| 4,146,967 A * | 4/1979 | Rohner | G01B 21/20 33/530 |
| 5,047,966 A | 9/1991 | Crow et al. | |
| 6,106,204 A * | 8/2000 | Dansereau | B23D 1/30 409/184 |
| 6,422,082 B1 * | 7/2002 | Suh | G01N 29/0618 73/632 |
| 6,681,464 B1 * | 1/2004 | Dupuis | B25B 5/14 269/282 |
| 6,969,821 B2 | 11/2005 | Mika et al. | |
| 7,178,255 B1 * | 2/2007 | Roesel | F01D 25/285 33/645 |
| 7,207,869 B2 * | 4/2007 | James | B24C 3/20 451/84 |
| 7,296,331 B2 * | 11/2007 | Mascarenas | B23Q 3/183 29/27 R |
| 7,513,027 B2 * | 4/2009 | Boehm | G05B 19/4207 356/601 |
| 7,765,668 B2 * | 8/2010 | Townsend | G06T 7/0004 29/407.04 |
| 8,244,025 B2 | 8/2012 | Davis et al. | |

(Continued)

*Primary Examiner* — Freddie Kirkland, III
(74) *Attorney, Agent, or Firm* — Shumaker & Sieffert, P.A.

(57) ABSTRACT

An inspection support apparatus comprises a support bed and a platform base wherein the support bed includes spaced first and second index surfaces adapted to support first and second portions, respectively, of an airfoil in fixed positions relative to the support bed. An adjustment apparatus is coupled to the support bed and the platform base and is adapted to establish a desired fixed positional relationship between the support bed and the platform base in three dimensions.

10 Claims, 9 Drawing Sheets

(56) References Cited

U.S. PATENT DOCUMENTS

| | | | | |
|---|---|---|---|---|
| 8,584,512 B2* | 11/2013 | Clarke | ............ | G01M 3/26 |
| | | | | 73/37.5 |
| 9,435,766 B2 | 9/2016 | Plotnikov et al. | | |
| 10,011,469 B2* | 7/2018 | Craft | .............. | B33Y 40/00 |
| 10,053,238 B1* | 8/2018 | Schilling | ............ | G01N 3/20 |
| 10,105,804 B2* | 10/2018 | Horn | .............. | B23Q 3/063 |
| 10,227,874 B2* | 3/2019 | Heinrich | .......... | B25B 11/02 |
| 10,252,410 B2* | 4/2019 | Luis y Prado | ...... | B25H 1/04 |
| 2005/0268461 A1* | 12/2005 | Ouellette | .......... | B25B 5/087 |
| | | | | 29/889.7 |
| 2005/0268463 A1* | 12/2005 | Ouellette | .......... | B25B 5/14 |
| | | | | 29/799 |
| 2006/0189265 A1* | 8/2006 | James | ............. | B24C 3/20 |
| | | | | 451/82 |
| 2012/0148355 A1* | 6/2012 | Clarke | ............ | G01M 3/26 |
| | | | | 73/40 |
| 2015/0048564 A1* | 2/2015 | Archer | ............ | B66F 7/16 |
| | | | | 269/58 |
| 2018/0237164 A1* | 8/2018 | Schilling | ............ | B64F 5/60 |
| 2021/0221538 A1* | 7/2021 | Dreyfoos | ........... | G01M 5/0016 |

* cited by examiner

INSPECTION SUPPORT APPARATUS

FIELD OF DISCLOSURE

The present subject matter relates generally to inspection devices, and more particularly to a an inspection support apparatus that supports, for example, a part of a gas turbine engine.

BACKGROUND

Often, it is desirable or necessary to inspect one or more items in a device to check for wear and/or damage thereto. For example, airfoil blade(s) of a compressor or turbine stage of a gas turbine engine may be removed from the engine and inspected using a micro-photographic apparatus.

In one example, the airfoil is held in place for microphotography by a mass of modelling clay. Such a positioning technique is problematic in that the micro-photography apparatus has a limited depth-of-field, requiring precise positioning of the airfoil relative to the micro-photography apparatus. Consequently, in an extensive and iterative process, the modelling clay must be properly shaped (such as into a flattened ball), the airfoil properly located in the mass of clay, and the clay and airfoil positioned relative to the micro-photography apparatus (and/or the micro-photography apparatus must be positioned relative to the airfoil supported by the clay) to dispose the airfoil at the precise position. Also, should it become necessary to reposition the airfoil, the extensive process of shaping the modeling clay and positioning the airfoil relative to the micro-photography apparatus must be repeated.

Crow et al. U.S. Pat. No. 5,047,966 discloses a method of measuring an airfoil wherein a computer-operated coordinate measuring machine is used to extract data points from an airfoil surface. As shown in FIG. 1, the coordinate measuring machine has a table holding an airfoil or turbine blade using clamps at the root and tip of the blade. The clamp at the tip of the blade is held by a vertical fixture supported on the table.

Mika et al. U.S. Pat. No. 6,969,821 discloses a method of qualifying airfoil blades with an automated airfoil blade qualification system. An airfoil blade is secured into a fixture, and digital measurements of the blade are collected and compared to digital measurements of a target blade. The fixture to which the airfoil blade is secured may be a high precision fixture configured to hold the blade in a particular orientation with respect to the fixed reference frame as measurements are taken.

Davis et al. U.S. Pat. No. 8,244,025 discloses a method of coalescing information about inspected objects wherein the method comprises acquiring an image set of an object to be inspected (both two-dimensional images and three-dimensional model of the object), identifying a location of interest on a surface of the model object, designating global coordinate points of the model object that characterize the location as one of interest, and creating a markup tag of information that annotates the location of interest that will be used with a two-dimensional image to have at least one image point that correlates to a corresponding designed global coordinate point of the model object. The three-dimensional model in the image set may be generated from data obtained by a suitable inspection apparatus that may utilize a digital photography apparatus and a three-dimensional measurement element such as a structured light panoramic scanner.

Plotnikov et al. U.S. Pat. No. 9,435,766 discloses a system and method for inspection of components using on-site eddy current based inspection. A self-alignment unit is coupled to the probe to align an axis of the probe to be substantially perpendicular to a surface of the component and to maintain constant contact with the surface of the component.

SUMMARY

According to one aspect, an inspection support apparatus comprises a support bed and a platform base wherein the support bed includes spaced first and second index surfaces adapted to support first and second portions, respectively, of an airfoil in fixed positions relative to the support bed. An adjustment apparatus is coupled to the support bed and the platform base and is adapted to establish a desired fixed positional relationship between the support bed and the platform base in three dimensions.

According to a further aspect, an inspection support apparatus comprises a support bed adapted to receive an airfoil thereon and a platform base. A connection member is coupled by a hinge to the platform base wherein the support bed is secured to the connection member at a first selected orientation relative to the platform base. A linkage is fixed to the connection member wherein the connection member is rotatable about the hinge relative to the platform base and the linkage is movable into contact with a particular portion of the platform base to cause the support bed to be disposed at a second selected orientation with respect to the platform base.

According to yet another aspect, an inspection support apparatus disposed in a three dimensional space defined by mutually orthogonal X, Y, and Z axes comprises a support bed having at least first and second surfaces that are configured to support an airfoil at multiple locations, wherein the inspection support apparatus further includes a platform base. A connection member is coupled by a hinge to the platform base wherein the support bed is secured to the connection member and is movably positionable at a first selected orientation along the X and Z axes relative to the platform base. A linkage is fixed to the connection member wherein the connection member is rotatable about the hinge relative to the platform base and the linkage is movable into contact with a particular portion of the platform base to cause the support bed to be movably positionable at a second selected orientation along the Y and Z axes with respect to the platform base.

Other aspects and advantages will become apparent upon consideration of the following detailed description and the attached drawings wherein like numerals designate like structures throughout the specification.

DETAILED DESCRIPTION

Figure 7:
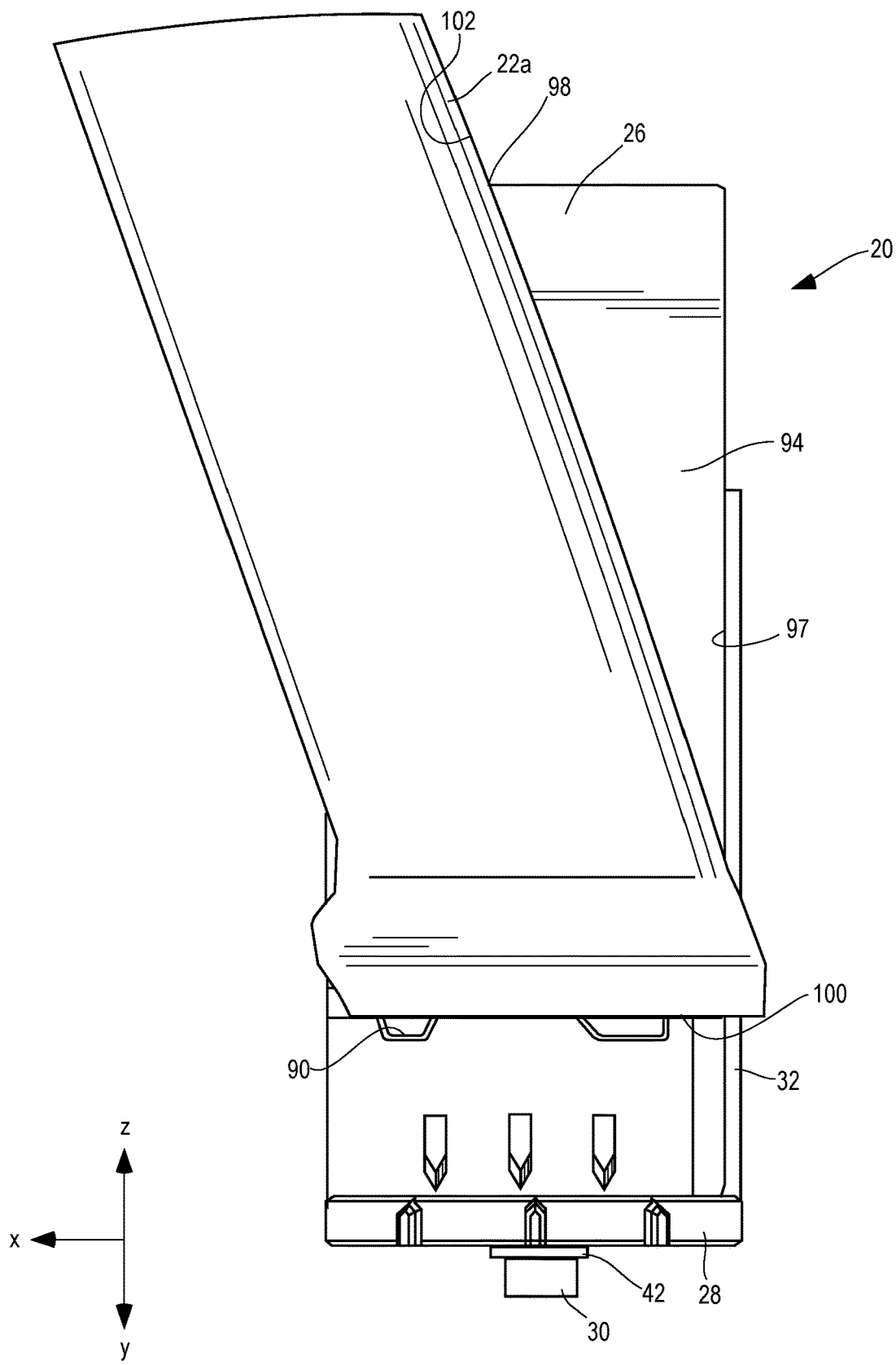
FIG. 7 is a top perspective view of the inspection support apparatus of FIG. 1 shown holding a large airfoil.
Figure 8:
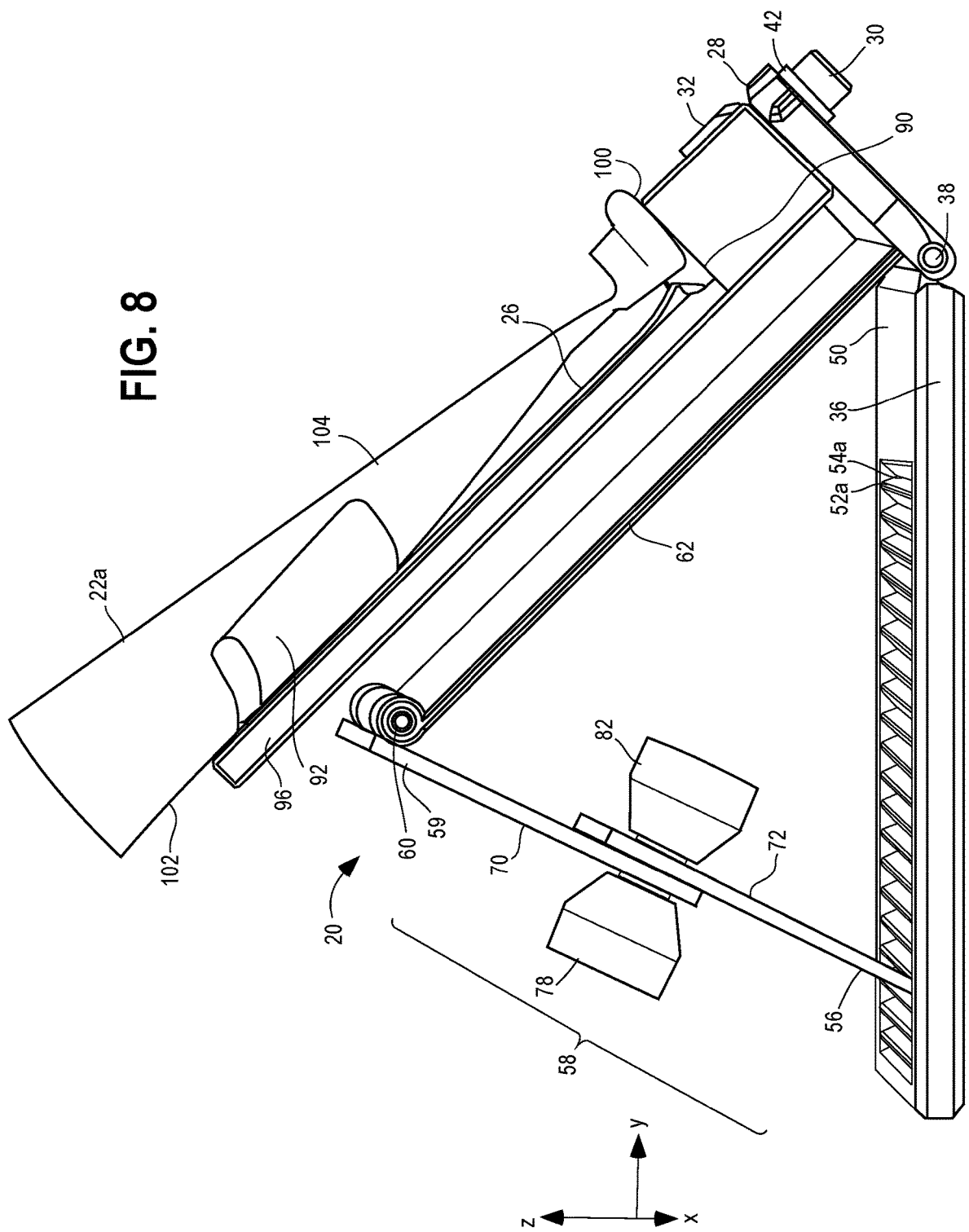
FIG. 8 is a side perspective view of the inspection support apparatus and large airfoil of FIG. 7.
Figure 9:
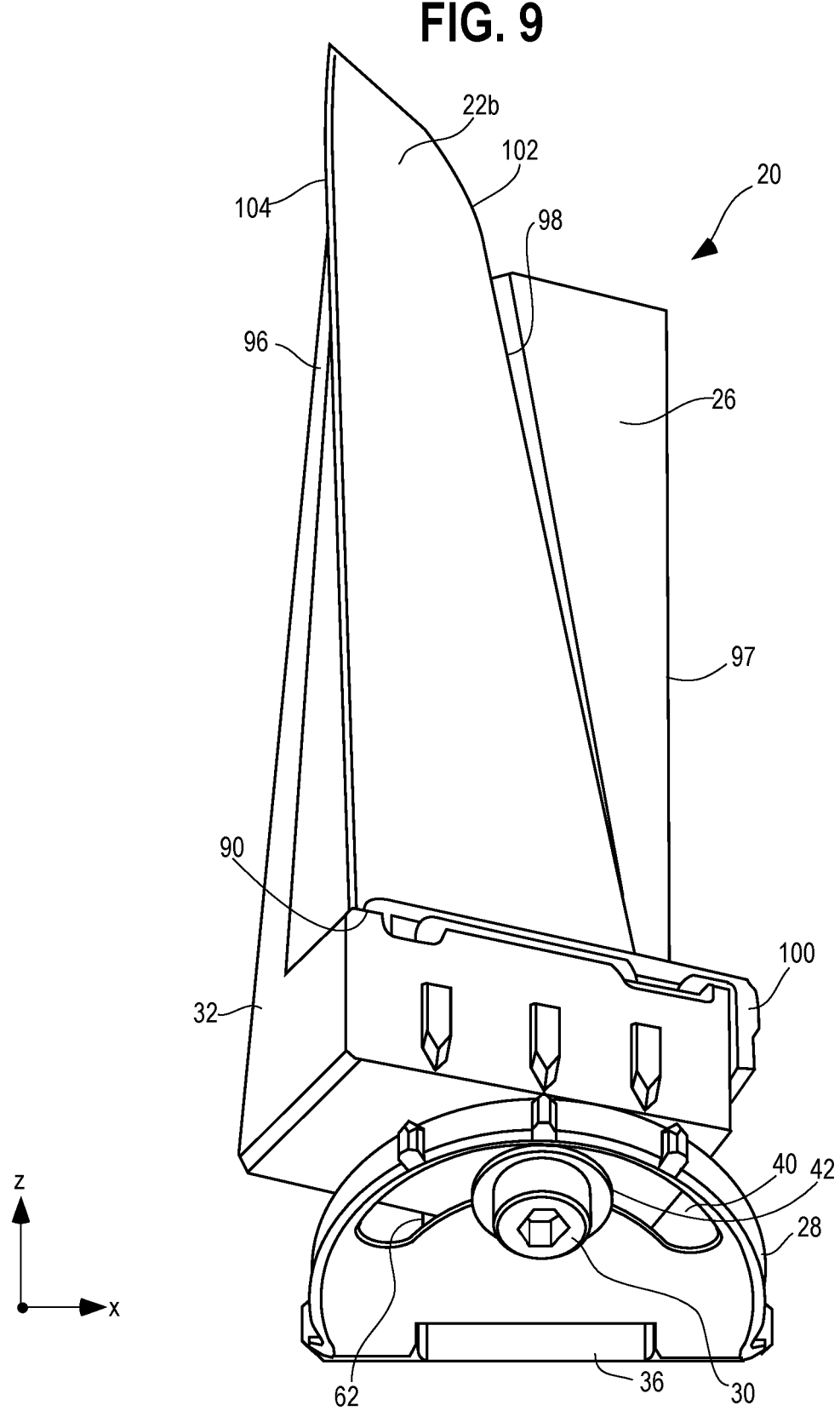
FIG. 9 is a front perspective view of the inspection support apparatus of FIG. 1 shown holding a small airfoil at an oblique angle.

Referring first to FIGS. 1, 2, and 7-9, an inspection support apparatus 20 may be used to position a part of a device, such as an airfoil 22a, 22b (examples of which are shown in FIGS. 7-9) of a compressor section or turbine section of a gas turbine engine, and to maintain the part at a desired position for inspection. The inspection may be undertaken using any desired inspection device, such a micro-photographic apparatus (not shown).

The apparatus 20 comprises a support bed 26 adapted to receive the airfoil 22 and to support the airfoil 22 thereon. A connection member 28 is secured by a threaded fastener 30 to an end 32 of the support bed 26. The support bed 26 has a linkage 34 secured thereto. A platform base 36 is coupled by a hinge 38 to the connection member 28.

Referring to FIGS. 1-6, the connection member 28 includes a slot 40, which, in the preferred embodiment, is arcuate in shape, although the slot may be of any other suitable shape or combination of shapes. The threaded fastener 30 comprises a bolt or other fastener having a washer 42 that engages and bears against portions of the connection member 28 adjacent the slot 40 when the fastener 30 is fully threaded into a nut 43 (FIGS. 2, 4) in the end 32 of the support bed 26 so as to secure the support bed 26 to the connection member 28 at a desired position.

The platform base 36 includes an upper surface 50 having a plurality of spaced parallel ribs 52a, 52b, 52t defining a plurality of spaced parallel channels 54a, 54b, . . . , 54u. The channels 54 are sized to accept a lower end 56 of a support leg 58 comprising a part of the linkage 34. An upper end 59 of the support leg 58 is, in turn coupled by a hinge 60 to a stand-off member 62 further comprising a part of the linkage 34. In the illustrated embodiment, the stand-off member 62 is immovably fixed to the connection member 28, although the stand-off member 62 may be movably and adjustably secured to the connection member 28, if desired. Further, although the stand-off member 62 is illustrated as being of a fixed length, the member 62 may instead have an adjustable length.

The support leg 58 has an adjustable length afforded by first and second separate portions 70, 72, respectively, that have overlapping openings 74, 76. The opening 74 may comprise a slot and the opening 76 may comprise a circular opening, or vice versa. Alternatively, the openings 74, 76 may both comprise slots of equal or unequal length. In any event, a first knob 78 with a threaded fastener 80 extends through the overlapping openings 74, 76 and a second knob 82 with a nut 84 (FIG. 4) is fully threaded onto the threaded fastener 80 with the portions 70, 72 disposed therebetween to fix the length of the support leg 58 as needed and as described in greater detail hereinafter.

If desired, one of the portions 70, 72 may be provided with a slot and a threaded stud could be attached by welding or otherwise to the other portion 70, 72 to extend through the slot and be engaged by a nut, a threaded knob, or other threaded member to secure the portions 70, 72 relative to one another.

The adjustability of the apparatus 20 will be discussed with reference to mutually orthogonal X, Y, and Z axes shown in FIGS. 1-9. The support bed 26 is positionable at a first selected orientation along the X and Z axes relative to the platform base 36 by pivoting the connection member 28 and the support bed 26 secured thereto by the fastener 30 in the direction of the arrow 85 (FIG. 3) about the hinge 38. Once a desired orientation along the X and Z axes is attained, the length of the support leg 58 is adjusted by loosening the knobs 78, 82, thereby allowing for shortening or lengthening of the support leg 58 so that the lower end 56 of the support leg 58 may be inserted into one of the channels 54. The knobs 78, 82 are tightened following positioning thereof to maintain the orientation of the support bed 26 along the X and Z axes.

Again, while the stand-off member 62 is illustrated as being of a fixed length, if the member 62 is of an adjustable length, then such length may be adjusted before or during the positioning process to allow the end 56 of the support leg 58 to be placed in a desired channel 54.

Figure 1:
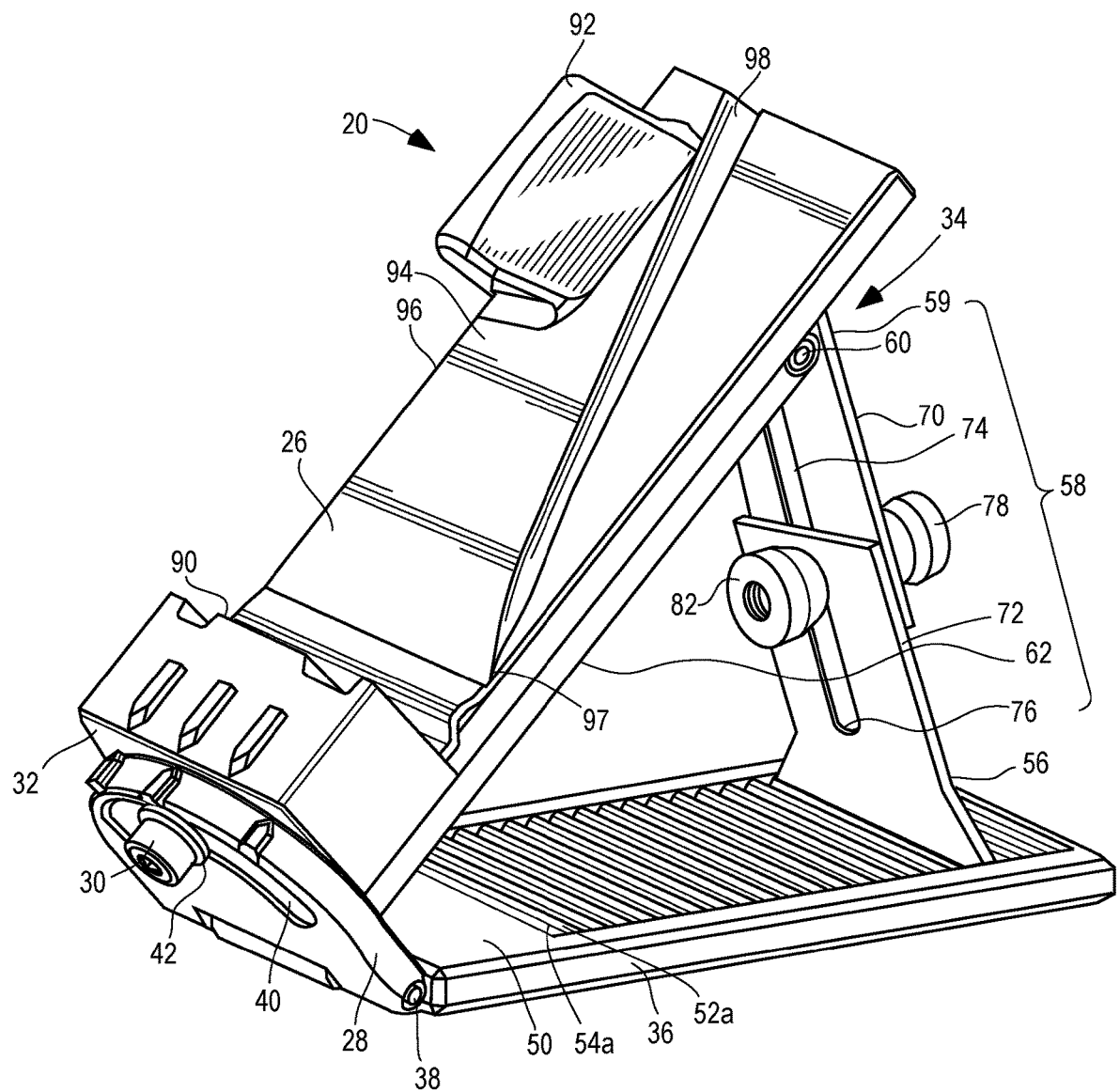
FIG. 1 is a front side isometric view of an inspection support apparatus according to an embodiment.
Figure 2:
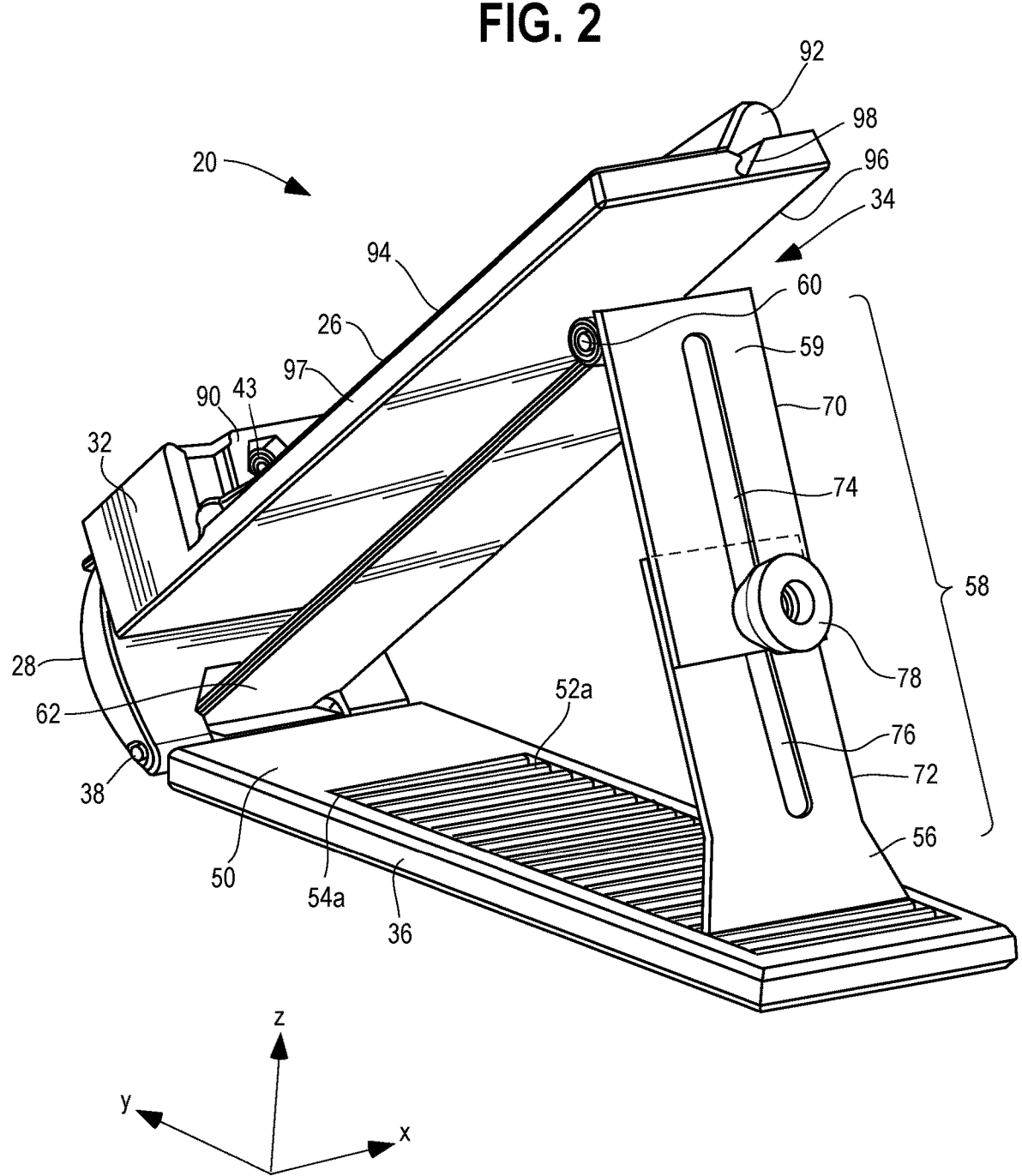
FIG. 2 is a rear side isometric view of the inspection support apparatus of FIG. 1.
Figure 3:
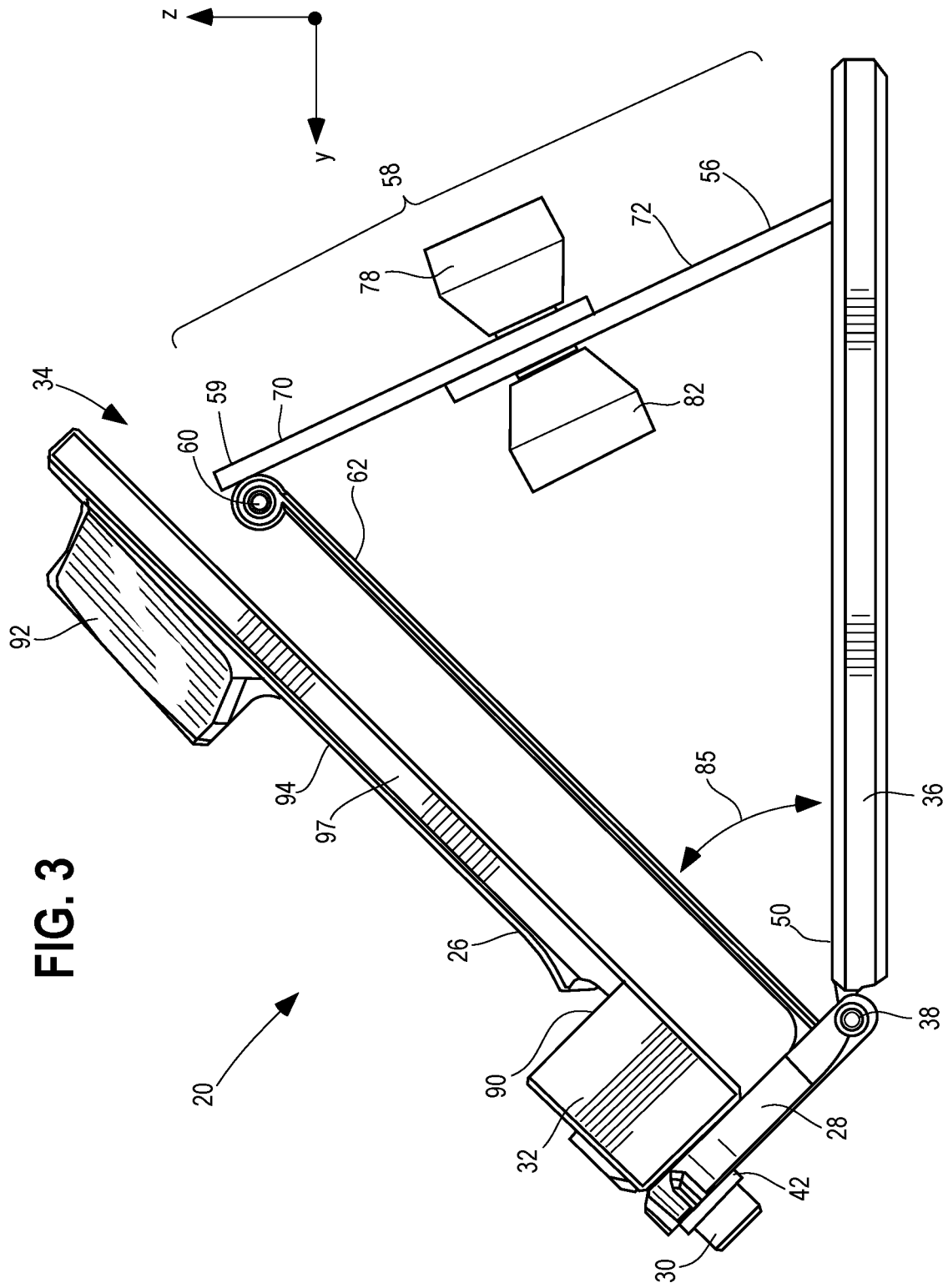
FIG. 3 is a right side elevational view of the inspection support apparatus of FIG. 1.
Figure 4:
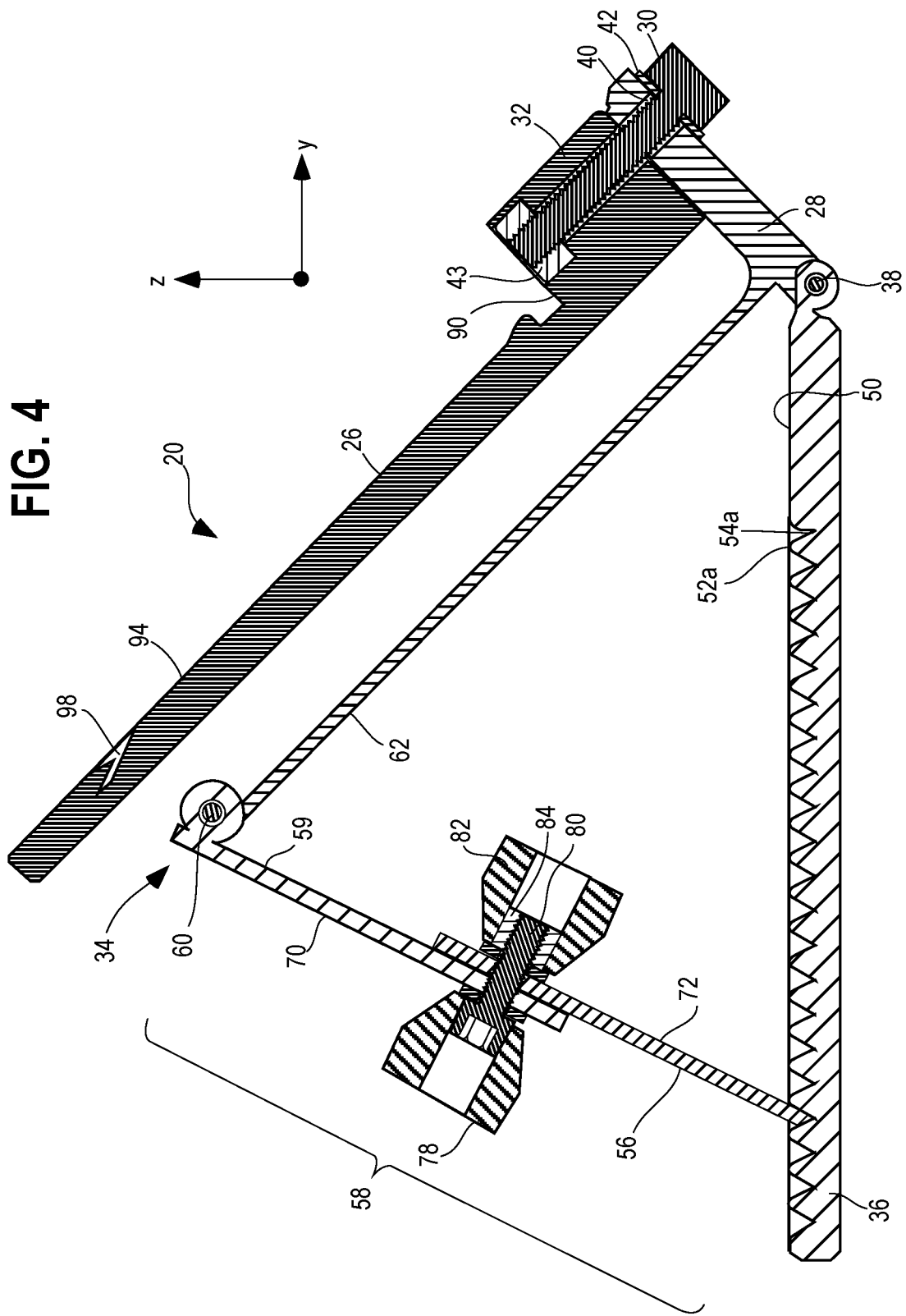
FIG. 4 is a left side sectional view of the inspection support apparatus of FIG. 1.
Figure 5:
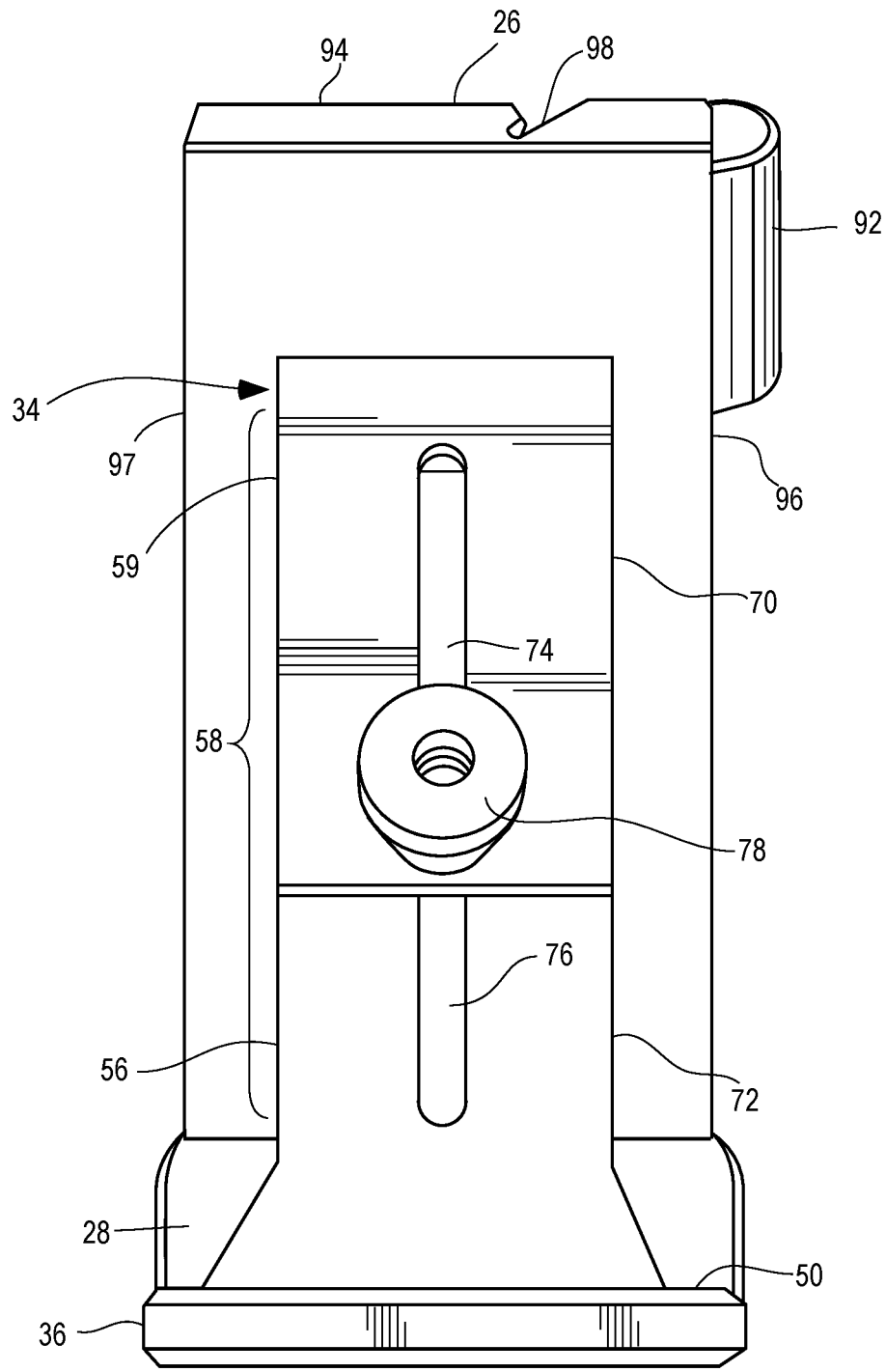
FIG. 5 is a rear side elevational view of the inspection support apparatus of FIG. 1.
Figure 6:
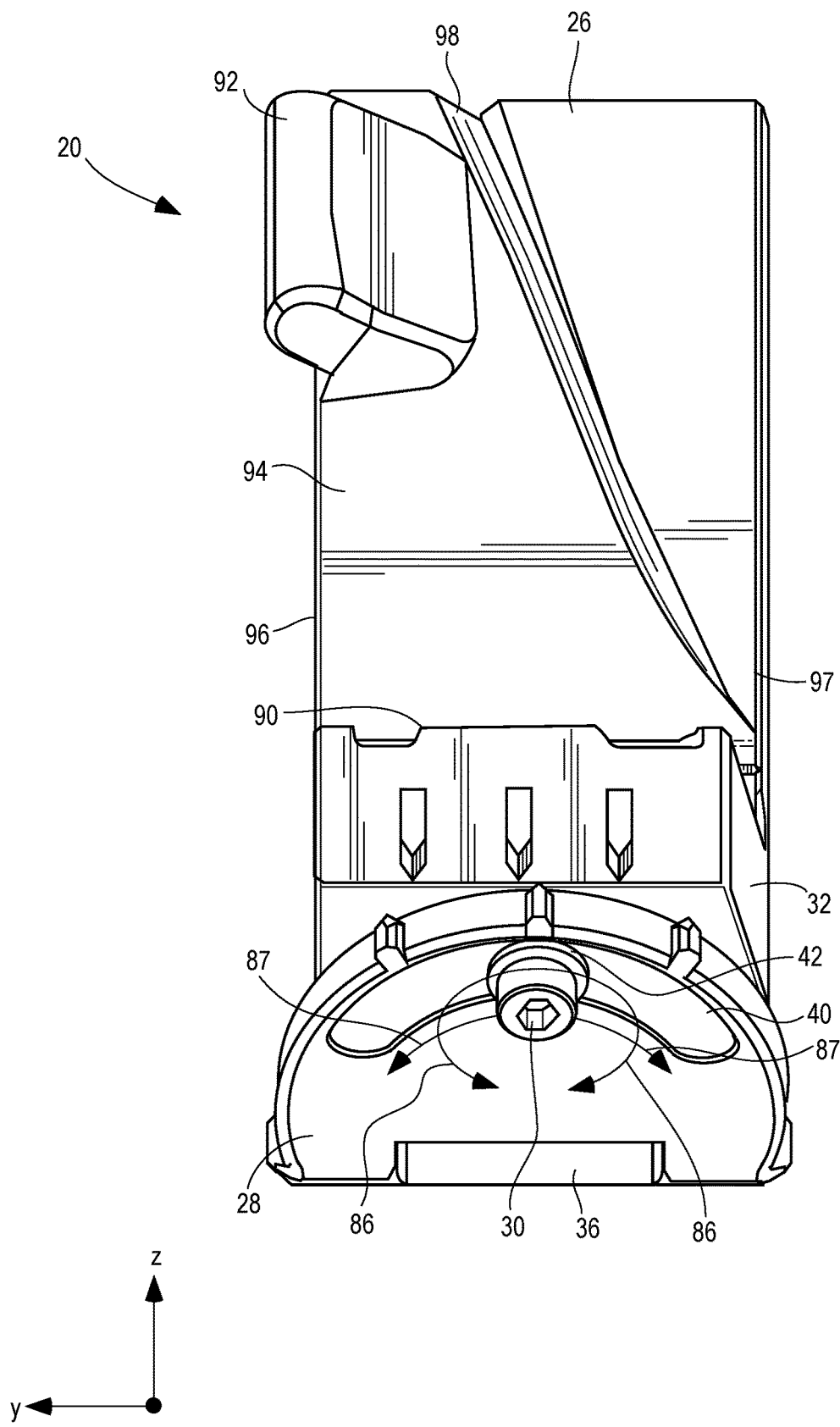
FIG. 6 is a front side elevational view of the inspection support apparatus of FIG. 1

The support bed 26 is movably positionable at a desired orientation along the Y and Z axes by loosening the threaded fastener 30 to allow movement along either or both of two degrees of freedom. More specifically, as seen in FIG. 6 the support bed 26 is rotatable about the threaded fastener 30 in the direction of the arrow 86 and/or the entire support bed 26 is translatable along the degree of freedom afforded by disposition of the fastener 30 in the slot 40 as indicated by the arrow 87. Thus, positioning at a desired orientation along the Y and Z axes can be effectuated, whereupon the fastener 30 may be tightened in the nut 43 to maintain the support bed 26 relative to the platform base 36. In this regard, interference between the support bed 26 and the linkage is avoided by the degree of freedom afforded by the slot 40.

FIGS. 7 and 8 illustrate a large airfoil 22a disposed on the support bed 26 whereas FIG. 9 illustrates a smaller airfoil 22b disposed on the support bed 26. The support bed 26 includes one or more features comprising index surfaces that assist in supporting an airfoil at fixed positions on the bed 26. In the illustrated embodiment, a shelf 90 is disposed at a lower end of the bed 26, a protruding flange 92 extends upwardly from an upper surface or face 94 of the bed 26 adjacent one side 96 thereof, and a curved channel 98 is disposed in the upper surface or face 94 at a location spaced from the protruding flange 92 intersecting a second side 97 thereof. The shelf 90 is planar and thus is adapted to support a lower surface 100 of a root portion of the airfoil 22a or 22b. The curved channel 98 is shaped to receive closely a side edge 102 of the airfoil 22a or 22b and the flange extends away from the upper surface or face 94 by a distance sufficient to support an undersurface 104 of the airfoil 22a or 22b while maintaining the lower surface 100 and the side edge 102 in intimate contact with the shelf 90 and the channel 98, respectively. A greater or lesser number and shape(s) of the index surfaces may be provided, as necessary or desirable. In the illustrated embodiment, the airfoil 22a, 22b is supported and positioned at least at three points by the index surfaces, although a greater or lesser number of support points or surfaces may be provided.

One or more of the components of the apparatus 20 may be made of one or more suitable materials, including plastic, metal, composite materials, fiberglass, etc.

INDUSTRIAL APPLICABILITY

The result in the preferred embodiment is that the airfoil 22a or 22b (or any other airfoil or part) may be supported for inspection by the apparatus 20 by 1.) positioning the part such that same is positioned and supported thereby by the index surfaces, 2.) suitably positioning the apparatus with the part disposed thereon on a table or other support surface relative to an inspection device, and/or 3.) loosening the threaded fastener 30 to allow positioning of the support bed 26 and part supported thereby along the degrees of freedom illustrated by the arrows 86 and/or 87 (FIG. 6) and thereafter tightening the fastener 30, and/or 4.) rotating the support bed 26 about the hinge 38 in the direction of the arrow 85 (FIG. 3), extending or shortening the support leg 58 (and/or the stand-off member, if such member is of an adjustable length) and placing the lower end 56 of the support leg 58 in one of the channels 54. The support bed 26, and hence, the part such as an airfoil 22, are disposed at and maintained at a desired fixed positionable relationship relative to the platform base 36 in three dimensions. Of course, not all of these steps must be undertaken in every case, and the steps need not be undertaken in the described order. In any event, the part is maintained in the desired position until the part must be repositioned or the inspection process is complete.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

I claim:

1. An inspection support apparatus, comprising:
a support bed adapted to receive an airfoil of a gas-turbine engine thereon and a platform base;
a connection member coupled by a hinge to the platform base wherein the support bed is secured to the connection member at a first selected orientation relative to the platform base; and
a linkage fixed to the connection member wherein the connection member is rotatable about the hinge relative to the platform base and the linkage is movable into contact with a particular portion of the platform base to cause the support bed to be disposed at a second selected orientation with respect to the platform base, wherein the connection member includes a slot and a threaded fastener extends through the slot and into a nut in the support bed.

2. The inspection support apparatus of claim 1, wherein the support bed includes at least first and second surfaces that are configured to support the airfoil at multiple locations.

3. The inspection support apparatus of claim 1, wherein the support bed includes a shelf at a bottom end thereof and a protruding flange at a side thereof.

4. The inspection support apparatus of claim 3, wherein the support bed further includes a channel disposed in a face of the support bed and spaced from the protruding flange.

5. The inspection support apparatus of claim 1, wherein the linkage includes a stand-off secured to the connection member and an adjustable support leg hingedly secured to the stand-off.

6. The inspection support apparatus of claim 5, wherein the adjustable support leg has a selectively adjustable length and the platform base includes an upper surface having a plurality of spaced ribs separated by channels and wherein an end of the support leg is positionable in a selected channel.

7. The inspection support apparatus of claim 1, wherein the slot is arcuate.

8. The inspection support apparatus of claim 1, wherein the airfoil comprises an airfoil from a compressor section of the gas-turbine engine.

9. The inspection support apparatus of claim 1, wherein the airfoil comprises an airfoil from a turbine section of the gas-turbine engine.

10. A system comprising:
an inspection support apparatus comprising:
a support bed adapted to receive an airfoil of a gas-turbine engine thereon and a platform base;
a connection member coupled by a hinge to the platform base wherein the support bed is secured to the connection member at a first selected orientation relative to the platform base; and
a linkage fixed to the connection member wherein the connection member is rotatable about the hinge relative to the platform base and the linkage is movable into contact with a particular portion of the platform base to cause the support bed to be disposed at a second selected orientation with respect to the platform base, wherein the inspection support apparatus is configured to maintain the airfoil at a desired position for static inspection.

* * * * *